United States Patent
Rozen et al.

(10) Patent No.: US 6,848,247 B2
(45) Date of Patent: Feb. 1, 2005

(54) GOLF BUNKER RAKE

(75) Inventors: Wayne A. Rozen, Binghamton, NY (US); Philip A. March, Sr., Binghamton, NY (US); John Brauer, Binghamton, NY (US)

(73) Assignee: Indian Valley Industries, Inc., Johnson City, NY (US)

( * ) Notice: Subject to any disclaimer, the term of this patent is extended or adjusted under 35 U.S.C. 154(b) by 0 days.

(21) Appl. No.: 10/341,586

(22) Filed: Jan. 14, 2003

(65) Prior Publication Data

US 2004/0134180 A1 Jul. 15, 2004

(51) Int. Cl.⁷ ................................................. A01F 7/06
(52) U.S. Cl. ................................ 56/400.16; 56/400.04
(58) Field of Search ......................... 56/400.01, 400.04, 56/400.07, 400.16

(56) References Cited

U.S. PATENT DOCUMENTS

| | | | |
|---|---|---|---|
| 1,191,911 A | | 7/1916 | Ritchie |
| 1,471,989 A | * | 10/1923 | Weis ................... 56/400.04 |
| 1,591,738 A | * | 7/1926 | Charles ............... 56/400.16 |
| 3,108,426 A | * | 10/1963 | Rugg ................... 56/400.01 |
| 3,724,188 A | * | 4/1973 | Eads ................... 56/400.17 |
| 3,999,244 A | | 12/1976 | Brickley |
| 4,078,368 A | | 3/1978 | Binder |
| 4,150,528 A | | 4/1979 | Rendin |
| 4,351,145 A | | 9/1982 | Farkas |
| 4,593,520 A | | 6/1986 | Krizman |
| 4,667,458 A | * | 5/1987 | Barrett ................ 56/400.16 |
| 4,741,149 A | | 5/1988 | Vom Braucke et al. |
| 4,744,208 A | | 5/1988 | King |
| 4,828,690 A | | 5/1989 | Montez |
| 5,099,638 A | | 3/1992 | Bass |
| 5,161,360 A | | 11/1992 | Hill |
| D353,979 S | | 1/1995 | Sargeant |
| D361,245 S | | 8/1995 | Altergott |
| 5,452,570 A | | 9/1995 | Schmid |
| 5,511,370 A | | 4/1996 | Patel |
| 5,522,209 A | | 6/1996 | Petruzzelli |
| D393,191 S | * | 4/1998 | Latto ..................... D8/13 |
| 5,927,057 A | | 7/1999 | Hueber |
| 6,009,697 A | | 1/2000 | Billado |
| 6,381,938 B1 | | 5/2002 | Kelly |

* cited by examiner

Primary Examiner—Meredith Petravick
(74) Attorney, Agent, or Firm—Roylance, Abrams, Berdo & Goodman L.L.P.

(57) ABSTRACT

A golf bunker rake has a coupling member adapted to receive a support. First teeth are connected to the support and have substantially round first tips. Second teeth are connected to the support and have substantially round second tips. The first teeth are longer than the second teeth. The rounded tips of the first teeth prevent damage to the golf bunker liner during use.

40 Claims, 4 Drawing Sheets

US 6,848,247 B2

GOLF BUNKER RAKE

FIELD OF THE INVENTION

The present invention relates to a golf bunker rake. More particularly, the present invention relates to a golf bunker rake having a first row of first teeth and a second row of second teeth. The first and second teeth have rounded tips. The second teeth are less wide and shorter than the first teeth. The first row of teeth are longer and glide over the liner in a sand bunker without damaging the liner, while the second row of teeth do not contact the liner and further rake and smooth the sand bunker.

BACKGROUND OF THE INVENTION

Golf bunkers may be formed by installing a liner in a hole in the earth. Sand is then used to fill the hole. The liner prevents mixing of the sand and the earth to provide an aesthetically pleasing golf bunker. Additionally, the liner prevents the erosion of sand on the steep faces of golf bunkers caused by rain, i.e., bunker washouts. The bunker washouts cause the sand to be contaminated with the clay or dirt base of the bunker, thereby requiring the sand to lose its brightness and appeal. The contaminated sand in the bunker has to be removed and replaced with fresh sand, which is a costly endeavor. Thus, liners are gaining popularity to prevent sand contamination in golf bunkers.

Rakes are used to upkeep the smooth and even surface of the sand to maintain the aesthetically pleasing appeal of the golf bunker. Existing rakes used to upkeep golf bunkers have sharp tips that tend to catch, tear and rip the golf bunker liner. This occurs even more frequently when power raking the bunker, i.e., when the golf bunker rake is attached to a motorized vehicle, such as a tractor. Once the liner has been damaged, teeth of rakes drag across the liner and bring earth up into the sand. The earth mixes with the sand resulting in sand contamination, which is the very result that the liners are used to prevent. In addition to having to remove and replace the sand, the liner has to be repaired or replace, which results in a time consuming and costly undertaking. Thus, a need exists for a golf bunker rake that does not tear the golf bunker liner during use.

Existing rakes for golf bunkers have only a single row of teeth for raking the sand of a golf bunker. The sand in the bunker often sticks together forming clumps, which takes several passes of a rake with a single row of teeth to break up and then smooth out the sand. This becomes even more difficult and time consuming when power raking the golf bunker as the rake is more difficult to control. Thus, a need exists for a golf bunker rake that more easily and quickly eliminates sand clumps when raking a golf bunker.

A need exists for improved golf bunker rakes.

SUMMARY OF THE INVENTION

A primary objective of the present invention is to provide a golf bunker rake having rounded teeth that do not damage the golf bunker liner during use.

Another objective of the present invention is to provide a golf bunker rake having first and second rows of to eliminate sand clumps in the golf bunker.

The foregoing objects are basically attained by providing a golf bunker rake having a coupling member adapted to receive a handle of a rake. First teeth are connected to the coupling member and have substantially round first tips. Second teeth are connected to the coupling member and have substantially round second tips. The first teeth are longer than the second teeth.

Other objects, advantages and salient features of the invention will become apparent from the following detailed description, which, taken in conjunction with the annexed drawings, discloses preferred embodiments of the invention.

BRIEF DESCRIPTION OF THE DRAWINGS

Referring now to the drawings that form a part of the original disclosure.

DETAILED DESCRIPTION OF THE INVENTION

Figure 1:
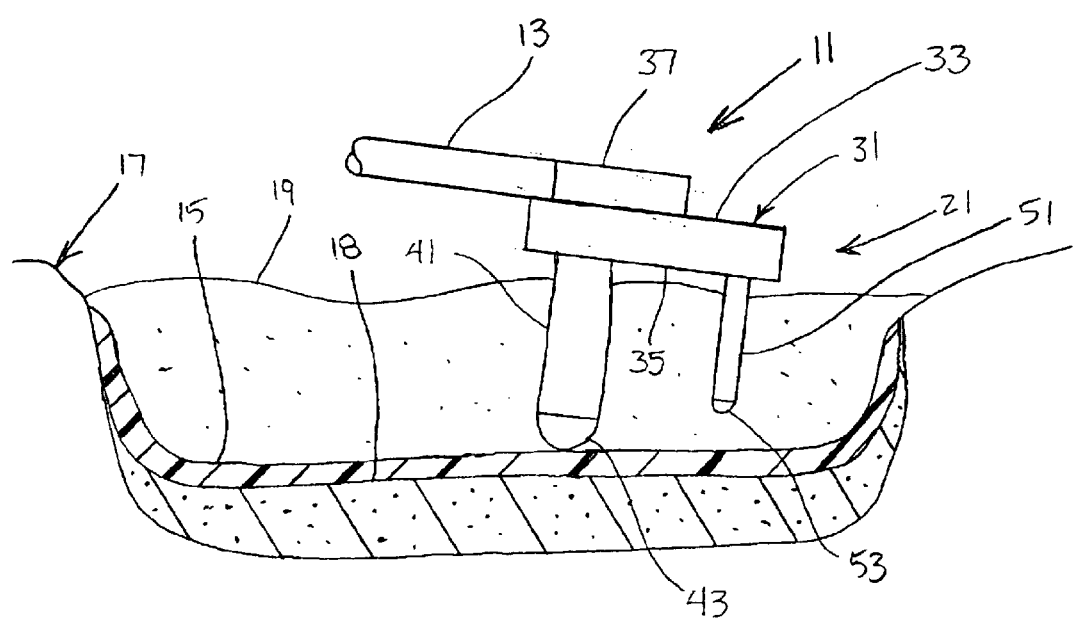
FIG. 1 is a diagram of a golf bunker rake according to the present invention in use in a golf bunker.

As shown in FIGS. 1–5, the present invention is a golf bunker rake 11. The golf bunker rake 11 has a head assembly 21 that includes a coupling member 31 and first and second teeth 41 and 51 connected to the coupling member. The coupling member 31 is adapted to receive a support. As shown in FIG. 1, the support is a shaft 13 of a golf bunker rake 11 that is gripped by a user for manually raking a golf bunker. Alternatively, the support may be attached to a vehicle, such as a tractor, for receiving the support head assembly 21 to power rake a golf bunker 17. First teeth 41 are connected to the coupling member 31 and have substantially round first tips 43. Second teeth 51 are connected to the coupling member 31 and have substantially round second tips 53. The first teeth 41 are longer than the second teeth 51. The first teeth 41 are longer and glide over the liner 15 in a sand bunker 17 without damaging the liner, while the second teeth 51 do not contact the liner and further rake and smooth the sand bunker. Furthermore, the second teeth 51 break up clumps in the sand 19, while the first teeth 41 further smooth and even the sand.

As shown in FIG. 1, many golf bunkers 17 are now made with a liner 15 separating the earth 18 from the sand 19. The liner 15 prevents the earth 18 from mixing with and contaminating the sand 19 to provide and maintain an aesthetically pleasing golf bunker 17.

Figure 2:
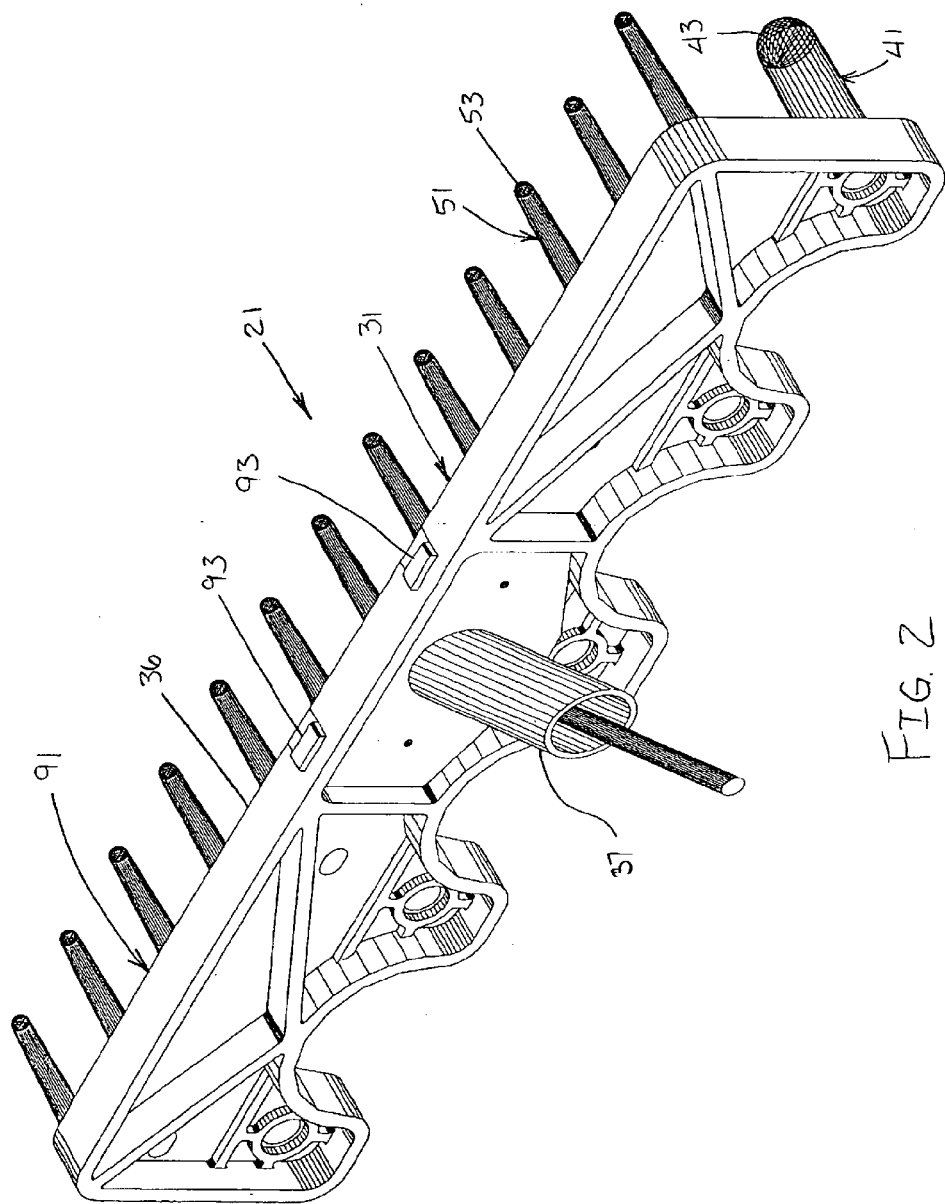
FIG. 2 is a front perspective view of the first half of the support head assembly of the present invention having tapered first and second teeth.
Figure 3:
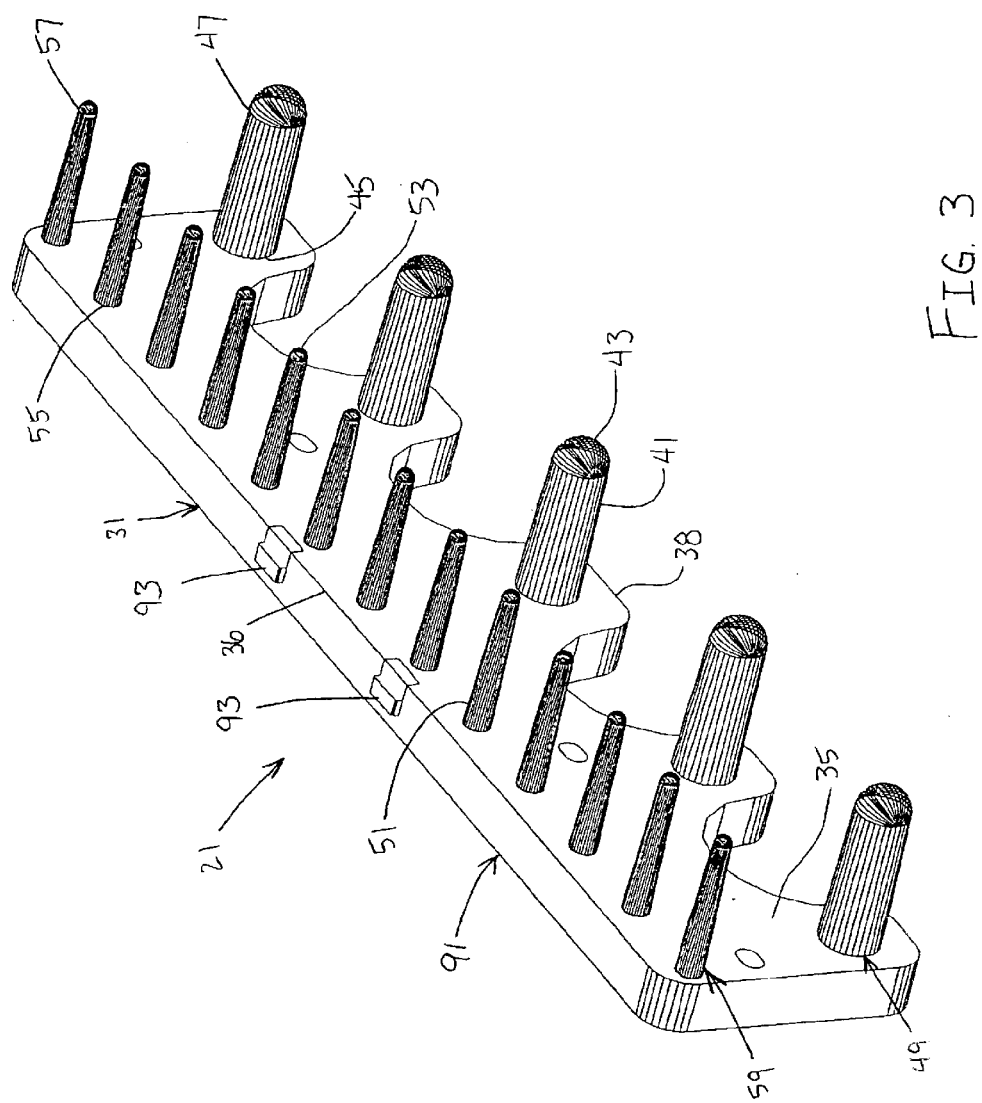
FIG. 3 is a rear perspective view of the first half of the support head assembly of FIG. 1 having tapered first and second teeth.
Figure 4:
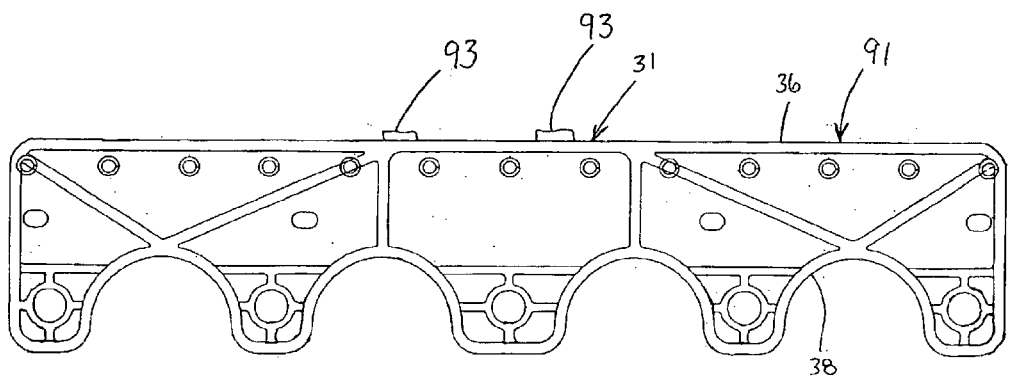
FIG. 4 is a front elevational view of the first half of the support head assembly of FIG. 2.

The coupling member 31 is adapted to receive the handle 13 of the golf bunker rake 11. The coupling member 31 has a first surface 33 and a second surface 35. The second surface has a first edge 36 and a second edge 38. In one embodiment, a receiver 37, or receiving clip, extends outwardly from the first surface 33 of the coupling member 31 and receives the shaft 13 of a rake, as shown in FIGS. 1 and 2. In another embodiment, the coupling member 31 is bolted to a support on a vehicle. The rake shaft 13 may be connected to the receiver 37 in any manner suitable to provide a secure connection, such as threading or welding. The first and second teeth 41 and 51 are connected to and extend outwardly from the second surface 35 of the coupling member 31, as shown in FIG. 3. The first and second teeth are connected to the coupling member 31 in any manner suitable to provide a secure connection, such as by threading or welding. As shown in FIG. 4, the coupling member 31 has first and second sockets 42 and 52, respectively, for receiving the first and second teeth 41 and 51. In another embodiment, first and second halves 91 and 92 are connected together to form the coupling member 31. Tabs 93 on the first halves 91 are received by slots 95 on the second halves to secure the first and second halves together to form the coupling member 31.

The first teeth 41 have first bases 45 connected to the second surface 35 of the coupling member 31. The first teeth 41 are substantially conical from the first base 45 to the first end 47. A substantially hemi-spherical first tip 43 extends outwardly from the first end 47 to provide a substantially round first tip to the first teeth 41. In one embodiment, the first teeth 41 do not taper between the first base 45 and the first end 47. Preferably, the first teeth 41 taper inwardly from the first base 45 to the first end 47. Preferably, the first teeth 41 are unitarily formed.

The second teeth 51 have second bases 55 connected to the second surface 35 of the coupling member 31. The second teeth 51 are substantially conical from the second base 55 to the second end 57. A substantially hemi-spherical second tip 53 extends outwardly from the second end 57 to provide a substantially round second tip to the second teeth 51. In one embodiment, the second teeth 51 do not taper between the second base 55 and the second end 57. Preferably, the second teeth 51 taper inwardly from the second base 55 to the second end 57. Preferably, the second teeth 51 are unitarily formed.

The first teeth 41 form a first row 49, as shown in FIG. 3. Preferably, the first row 49 is proximal the first edge 36 of the coupling member 31. The second teeth 51 form a second row 59. Preferably, the second row 59 is proximal the second edge 38 of the coupling member 31. Preferably, the first row 49 has five first teeth 41 and the second row 59 has thirteen second teeth 51. Preferably, the first and second rows 49 and 59 are non-linear and parallel to one another. Alternatively, the first and second rows 49 and 59 may be switched so that the second row is proximal the first edge and the first row is proximal the second edge.

Figure 5:
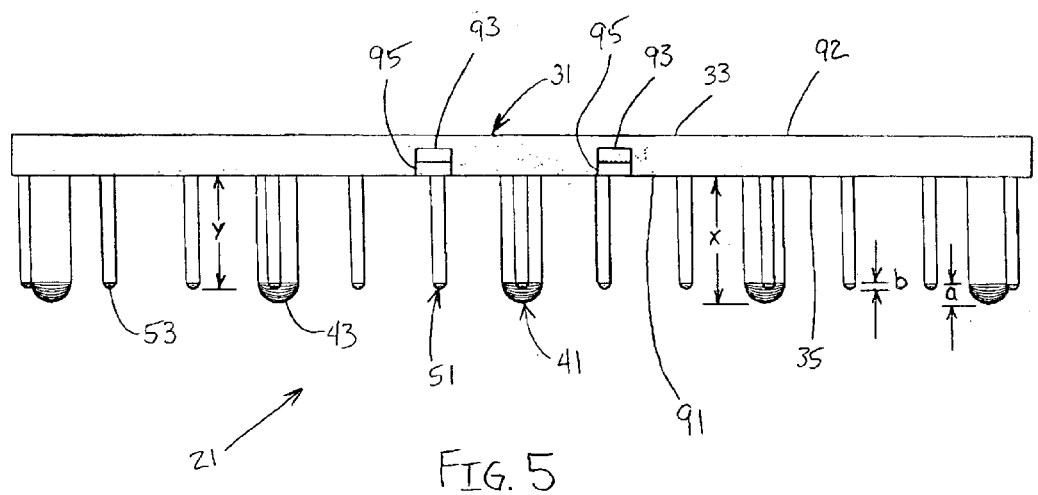
FIG. 5 is a top plan view of the coupling member of the golf bunker rake of FIG. 1 with non-tapered first and second teeth.

The first teeth 41 are longer than the second teeth 51, as shown in FIGS. 3 and 5. The first teeth 41 have a length "x" from the first base 45 to the first tip 43, as shown in FIG. 5. The second teeth 51 have a length "y" from the second base 55 to the second tip 53, as shown in FIG. 5. Preferably, "y" is approximately 89% of "x".

The first tip 43 has a radius "a", as shown in FIG. 5. The second tip 53 has a radius "b", as shown in FIG. 5. Preferably, the radius "a" of the first tip 43 is approximately three times the radius "b" of the second tip 53. The first base 45 is wider than the second base 55.

Alternatively, the coupling member 31, first teeth 41 and second teeth 51 may be unitarily formed.

The coupling member 31, first teeth 41 and second teeth 51 may be made from polypropylene, neoprene, urethane, aluminum or steel.

Assembly and Use

The first teeth 41 and second teeth 51 are connected to the coupling member 31 to form the support head assembly 21. The support head assembly 21 is then connected to a support, such as a shaft 13 to form the golf bunker rake 11, which may be used by an individual to manually rake a golf bunker 17 or a support on a vehicle, such as a tractor, for power raking a golf bunker. Preferably, the first teeth 41 are forward of the second teeth 51, as shown in FIG. 1. However, the coupling member 31 may be configured so that the second teeth 51 are forward of the first teeth 41.

The first and second teeth 41 and 51 of the golf bunker rake 11 are inserted into the sand 19 of a golf bunker 17. The rounded tips 43 of the first teeth 41 glide over the liner 15 of the bunker, thereby preventing any damage to the liner of the bunker. The more widely spaced first teeth 41 break up any large clumps of sand in the bunker. The shorter second teeth 51 follow behind the first teeth 41. Since the second teeth 51 are shorter than the first teeth 51, the second teeth do not contact the liner 15 of the bunker 17 during the raking process, as shown in FIG. 1. The second teeth 41 are spaced more closely together than the first teeth 51, thereby breaking up smaller clumps of sand and smoothing and evening the sand of the golf bunker. Moreover, the shorter second teeth 51 make raking easier when the golf bunker rake 11 is used by an individual to maintain an aesthetically pleasing golf bunker 17.

While advantageous embodiments have been chosen to illustrate the invention, it will be understood by those skilled in the art that various changes and modifications may be made therein without departing from the scope of the invention as defined in the appended claims.

What is claimed is:

1. A golf bunker rake, comprising:
    a shaft;
    a coupling member connected to said shaft, said coupling member having a first edge and a second edge, said first edge being opposite said second edge;
    first teeth having first bases connected to said coupling member, each of said first teeth being substantially straight and having a substantially round first tip; said first teeth being linearly arranged and forming a first row proximal said first edge, each of said first teeth being substantially rigid; and
    second teeth having second bases connected to said coupling member, each of said second teeth being substantially straight and having a substantially round second tip, said second teeth being linearly arranged and forming a second row proximal said second edge, said first bases being wider than said second bases and said first teeth being longer than said second teeth, each of said second teeth being substantially rigid;
    wherein said first row and said second row are substantially parallel.

2. A golf bunker rake head assembly, comprising:
    a coupling member adapted to receive a support;
    first teeth connected to said coupling member, each of said first teeth having a substantially round first tip, and said first teeth being linearly arranged on said coupling member; and
    second teeth connected to said coupling member, each of said second teeth having a substantially round second tip and being shorter than each of said first teeth, and said second teeth being linearly arranged on said coupling member, said first tip having a first radius and said second tip having a second radius, said first radius being approximately three times larger than said second radius.

3. A golf bunker rake head assembly according to claim 2, wherein said first teeth form a first row and said second teeth form a second row.

4. A golf bunker rake head assembly according to claim 3, wherein said second row is forward of said first row.

5. A golf bunker rake head assembly according to claim 3, wherein said second row is behind said first row.

6. A golf bunker rake head assembly according to claim 2, wherein said coupling member, said first teeth and said second teeth are unitarily formed.

7. A golf bunker rake head assembly according claim 3, wherein said first row is non-linear with said second row.

8. A golf bunker rake head assembly according to claim 2, wherein said first teeth comprise five first teeth.

9. A golf bunker rake head assembly according to claim 2, wherein said second teeth comprise thirteen second teeth.

10. A golf bunker rake head assembly according to claim 2, wherein said first and second teeth and said coupling member are made from a material selected from the group consisting of neoprene, polypropylene, urethane, steel or aluminum.

11. A golf bunker rake head assembly, comprising:
a coupling member adapted to receive a support;
first teeth connected to said coupling member, each of said first teeth having a substantially round first tip, and said first teeth being linearly arranged on said coupling member; and
second teeth connected to said coupling member, each of said second teeth having a substantially round second tip and being shorter than each of said first teeth, and said second teeth being linearly arranged on said coupling member, said first teeth having a first base and said second teeth having a second base, said first base being wider than said second base, said first tip having a first radius and said second tip having a second radius, said first radius being approximately three times larger than said second radius.

12. A golf bunker rake head assembly according to claim 11, wherein said first teeth form a first row and said second teeth form a second row.

13. A golf bunker rake head assembly according to claim 12, wherein said second row is forward of said first row.

14. A golf bunker rake head assembly according to claim 12, wherein said second row is behind said first row.

15. A golf bunker rake head assembly according to claim 11, wherein said coupling member, said first teeth and said second teeth are unitarily formed.

16. A golf bunker rake head assembly according to claim 11, wherein said first teeth comprise five first teeth.

17. A golf bunker rake head assembly according to claim 11, wherein said second teeth comprise thirteen second teeth.

18. A golf bunker rake head assembly according to claim 11, wherein said first and second teeth taper inwardly from said first and second bases to the first and second tips, respectively.

19. A golf bunker rake head assembly according to claim 11, wherein said first and second teeth and said coupling member are made from a material selected from the group consisting of neoprene, polypropylene, urethane, steel or aluminum.

20. A golf bunker rake head assembly, comprising:
a coupling member adapted to receive a handle;
first teeth having a first base and a first length connected to said coupling member, each of said first teeth having a substantially round first end, and said first teeth being linearly arranged on said coupling member; and
second teeth having a second base and a second lenth connected to said coupling member, each of said second teeth having a substantially round second tip, and said second teeth being linearly arranged on said coupling member, said first base being wider than said second base, said first length being longer than said second length.

21. A golf bunker rake head assembly according to claim 20, wherein said first teeth form a first row and said second teeth form a second row.

22. A golf bunker rake head assembly according to claim 20, wherein said coupling member, said first teeth and said second teeth are unitarily formed.

23. A golf bunker rake head assembly according to claim 20, wherein said first teeth and said second teeth are threadably connected or welded to said coupling member.

24. A golf bunker rake head assembly according to claim 20, wherein said first teeth comprise five first teeth.

25. A golf bunker rake head assembly according to claim 20, wherein said second teeth comprise thirteen second teeth.

26. A golf bunker rake head assembly according to claim 20, wherein said first teeth have a first length and said second teeth have a second length, said first length being longer than said second length.

27. A golf bunker rake head assembly according to claim 20, wherein said first and second teeth and said coupling member are made from a material selected from the group consisting of neoprene, polypropylene, urethane, steel or aluminum.

28. A golf bunker rake head assembly, comprising:
a coupling member adapted to receive a handle;
first teeth having a first base connected to said coupling member, each of said first teeth having a substantially round first end, and said first teeth being linearly arranged on said coupling member; and
second teeth having a second base connected to said coupling member, each of said second teeth having a substantially round second tip, and said second teeth being linearly arranged on said coupling member, said first base being wider than said second base, said first teeth have a first length and said second teeth have a second length, said first length being longer than said second length.

29. A golf bunker rake head assembly according to claim 28, wherein said first teeth form a first row and said second teeth form a second row.

30. A golf bunker rake head assembly according to claim 28, wherein said coupling member, said first teeth and said second teeth are unitarily formed.

31. A golf bunker rake head assembly according to claim 28, wherein said first and second teeth and said coupling member are made from a material selected from the group consisting of neoprene, polypropylene, urethane, steel or aluminum.

32. A golf bunker rake head assembly according claim 28, wherein said coupling member has a first and a second surface, the handle being received by said first surface and said first and second teeth being connected to said second surface.

33. A golf bunker rake head assembly, comprising:
a coupling member adapted to receive a handle;
first teeth having a first base connected to said coupling member, each of said first teeth having a substantially round first end, and said first teeth being linearly arranged on said coupling member; and
second teeth having a second base connected to said coupling member, each of said second teeth having a substantially round second tip, and said second teeth being linearly arranged on said coupling member, said first base being wider than said second base, said first and second teeth taper inwardly from said first and second bases to said first and second tips, respectively.

34. A golf bunker rake head assembly according to claim 33, wherein said first teeth form a first row and said second teeth form a second row.

35. A golf bunker rake head assembly according to claim 33, wherein said coupling member, said first teeth and said second teeth are unitarily formed.

36. A golf bunker rake head assembly according to claim 33, wherein said first teeth and said second teeth are threadably connected or welded to said coupling member.

37. A golf bunker rake head assembly according to claim 33, wherein said first teeth have a first length and said second teeth have a second length, said first length being longer than said second length.

38. A golf bunker rake head assembly according to claim 33, wherein said first and second teeth and said coupling member are made from a material selected from the group consisting of neoprene, polypropylene, urethane, steel or aluminum.

39. A golf bunker rake head assembly according to claim 33, wherein said coupling member has a first and a second surface, the handle being received by said first surface and said first and second teeth being connected to said second surface.

40. A golf bunker rake head assembly according to claim 34, wherein said first row is non-linear with said second row.

* * * * *